(12) United States Patent
Hampel

(10) Patent No.: US 6,408,796 B1
(45) Date of Patent: Jun. 25, 2002

(54) RESIN HUTCH AND METHOD OF ASSEMBLY

(76) Inventor: Lance T. Hampel, 5678 W. Big Portage Lake Rd., Land O'Lakes, WI (US) 54540

( * ) Notice: Subject to any disclaimer, the term of this patent is extended or adjusted under 35 U.S.C. 154(b) by 0 days.

(21) Appl. No.: 09/437,465

(22) Filed: Nov. 10, 1999

Related U.S. Application Data

(60) Provisional application No. 60/154,997, filed on Sep. 21, 1999.

(51) Int. Cl.$^7$ .............................. A01K 1/02; E04H 15/00
(52) U.S. Cl. ......................... 119/498; 119/482; 135/87
(58) Field of Search ................................. 119/482, 484, 119/498, 499, 506, 513–515; 135/87, 90, 121–124; D30/108; D25/15

(56) References Cited

U.S. PATENT DOCUMENTS

| | | | |
|---|---|---|---|
| D222,365 S | | 10/1971 | Ahrens .......................... D30/1 |
| 3,690,299 A | * | 9/1972 | Johnson .......................... 119/1 |
| D227,269 S | | 6/1973 | Sedgwick ....................... D30/1 |
| D240,051 S | | 5/1976 | Mayfield ........................ D30/1 |
| 4,007,538 A | * | 2/1977 | Petrie ............................ 29/447 |
| D245,190 S | | 7/1977 | Higo .............................. D30/1 |
| 4,068,423 A | * | 1/1978 | Marsh ............................. 52/86 |
| 4,161,924 A | * | 7/1979 | Welker .......................... 119/19 |
| D255,723 S | | 7/1980 | Anderson ....................... D30/1 |
| 4,366,773 A | * | 1/1983 | Johanneck ..................... 119/16 |
| D267,904 S | | 2/1983 | Hampel et al. ................. D30/1 |
| D267,905 S | | 2/1983 | Keith ............................. D30/1 |
| 4,372,251 A | * | 2/1983 | Keith ............................ 119/16 |
| 4,793,286 A | * | 12/1988 | Buxton ......................... 119/19 |
| 4,887,397 A | * | 12/1989 | Peterson ......................... 52/86 |
| 5,033,943 A | * | 7/1991 | Senchuck ..................... 135/113 |
| D320,479 S | | 10/1991 | Cheval et al. .............. D30/108 |
| D327,143 S | | 6/1992 | Dickinson .................. D30/108 |
| D343,481 S | | 1/1994 | Hampel ...................... D30/108 |
| 5,335,684 A | * | 8/1994 | Hanninen .................... 135/102 |
| D363,367 S | | 10/1995 | Hampel ...................... D30/108 |
| D426,351 S | * | 6/2000 | Hampel ...................... D30/108 |

OTHER PUBLICATIONS

Applicant's Exhibit A, "Multimax Animal House", two–page color brochure of the Hampel Corp., Germantown, WI, undated, admitted prior art.
Applicant's Exhibit B, "Calf–tel comfort hutches", six–page color brochure of the Hampel Corp., Germantown, WI, undated, admitted prior art.
Applicant's Exhibit C, "EZ Hutch", four one–page color advertisments of EZ Hutch.
Calf Hutches & Equipment, Kettlersville, OH, 6/95, 12/95–1/96, 3–4/96 & 4/96, admitted prior art.
Applicant's Exhibit D, "PolyDome", one–page advertisement of PolyDome, Litchfield, MN, taken from Dec. 5, 1997 Capitol Press Livestock Edition, admitted prior art.

* cited by examiner

Primary Examiner—Charles T. Jordan
Assistant Examiner—Kimberly Smith
(74) Attorney, Agent, or Firm—Quarles & Brady LLP

(57) ABSTRACT

A plastic resin hutch has rigid ends spanned by a flexible cover disposed in grooves along the inside perimeter of the rigid ends. In one embodiment, the flexible cover is supported by metal rods attached to the rigid ends. In another embodiment, the cover is supported at the top by a channel and at the bottom by a radius both formed by flexing the cover along longitudinal kerf grooves on one side of the cover. The rigid ends are formed by a twin-sheet vacuum thermo-forming, blow molding or roto-molding process so as to include a door panel. The door panel includes a door that is partially cut free from the door panel so as to be integrally hinged to the door panel. The resin hutch may be transported in two shipping packages within the weight and size restrictions of common commercial couriers.

34 Claims, 16 Drawing Sheets

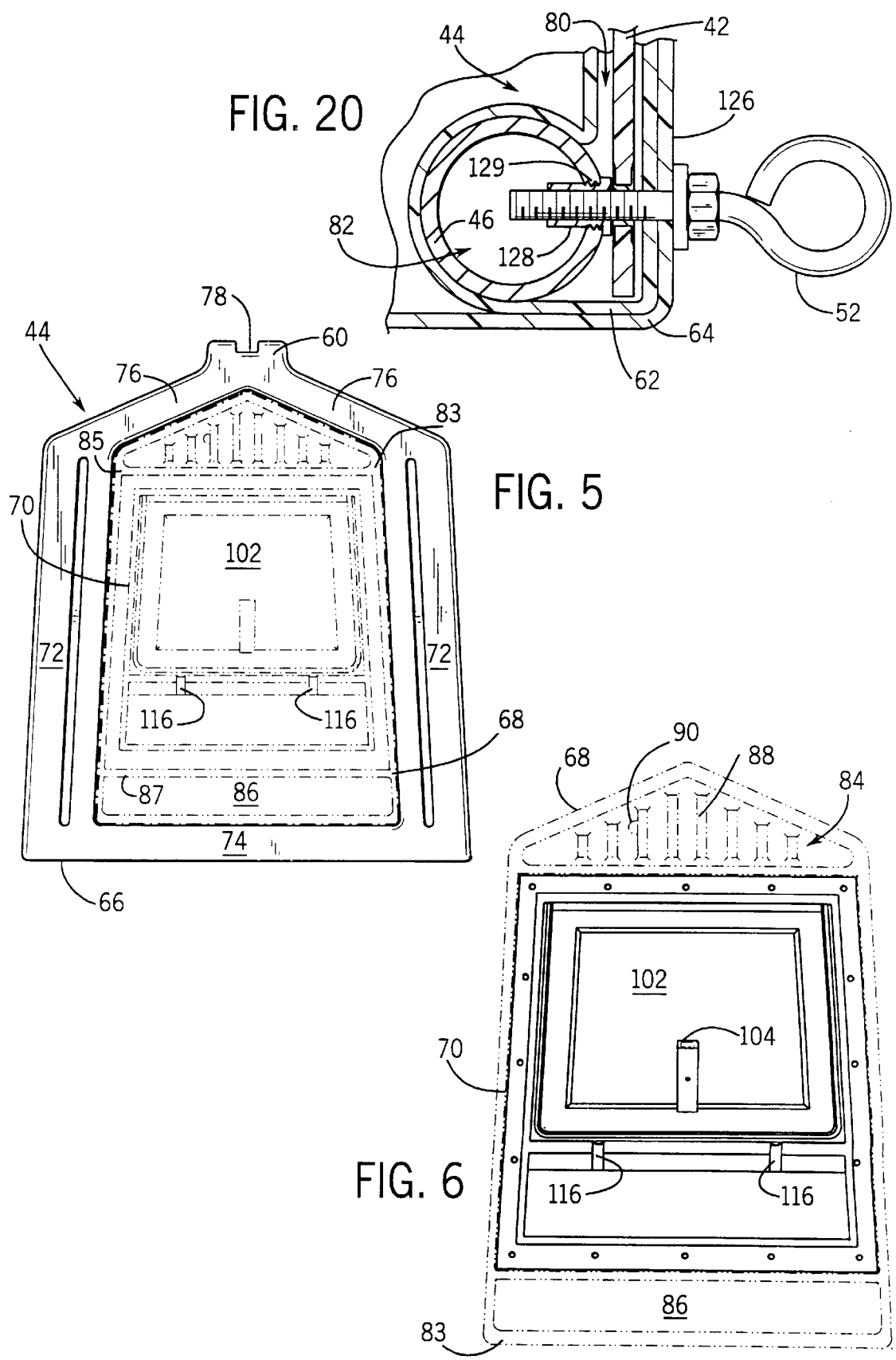

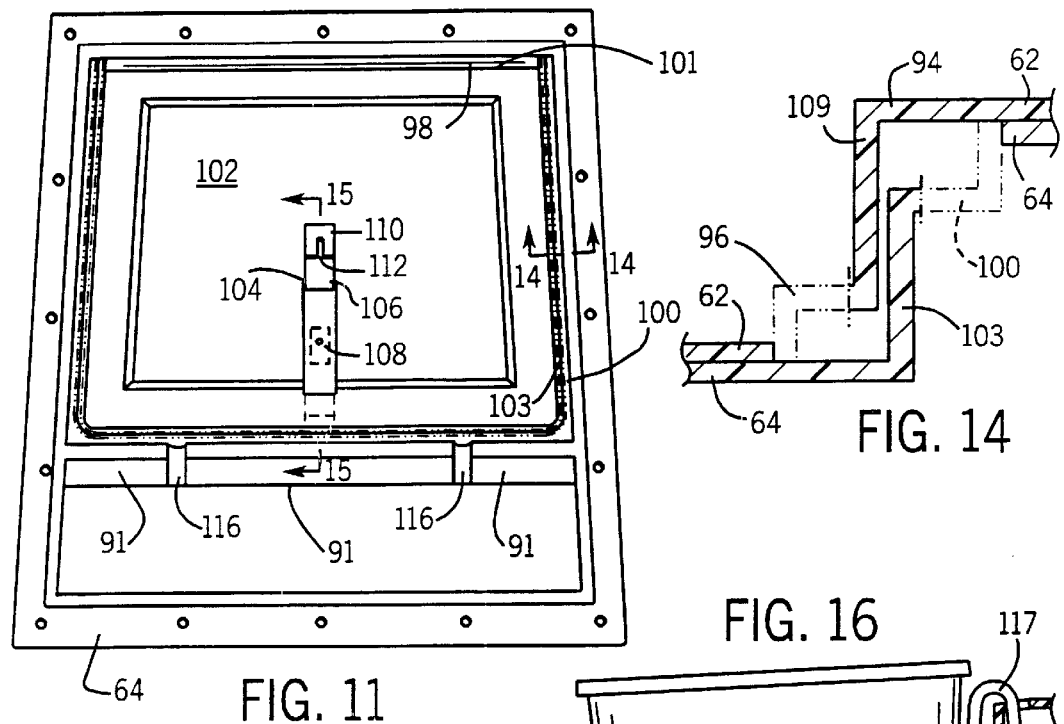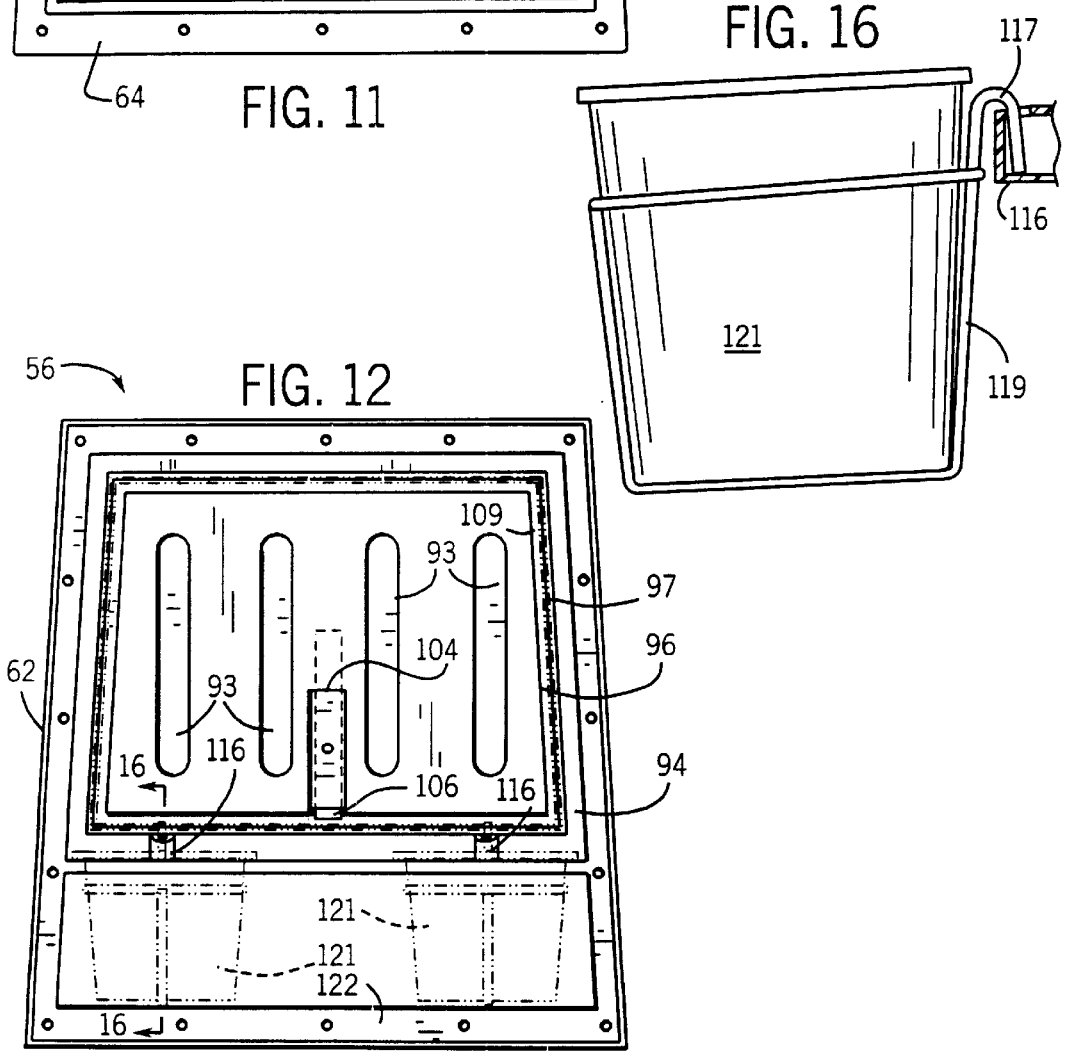

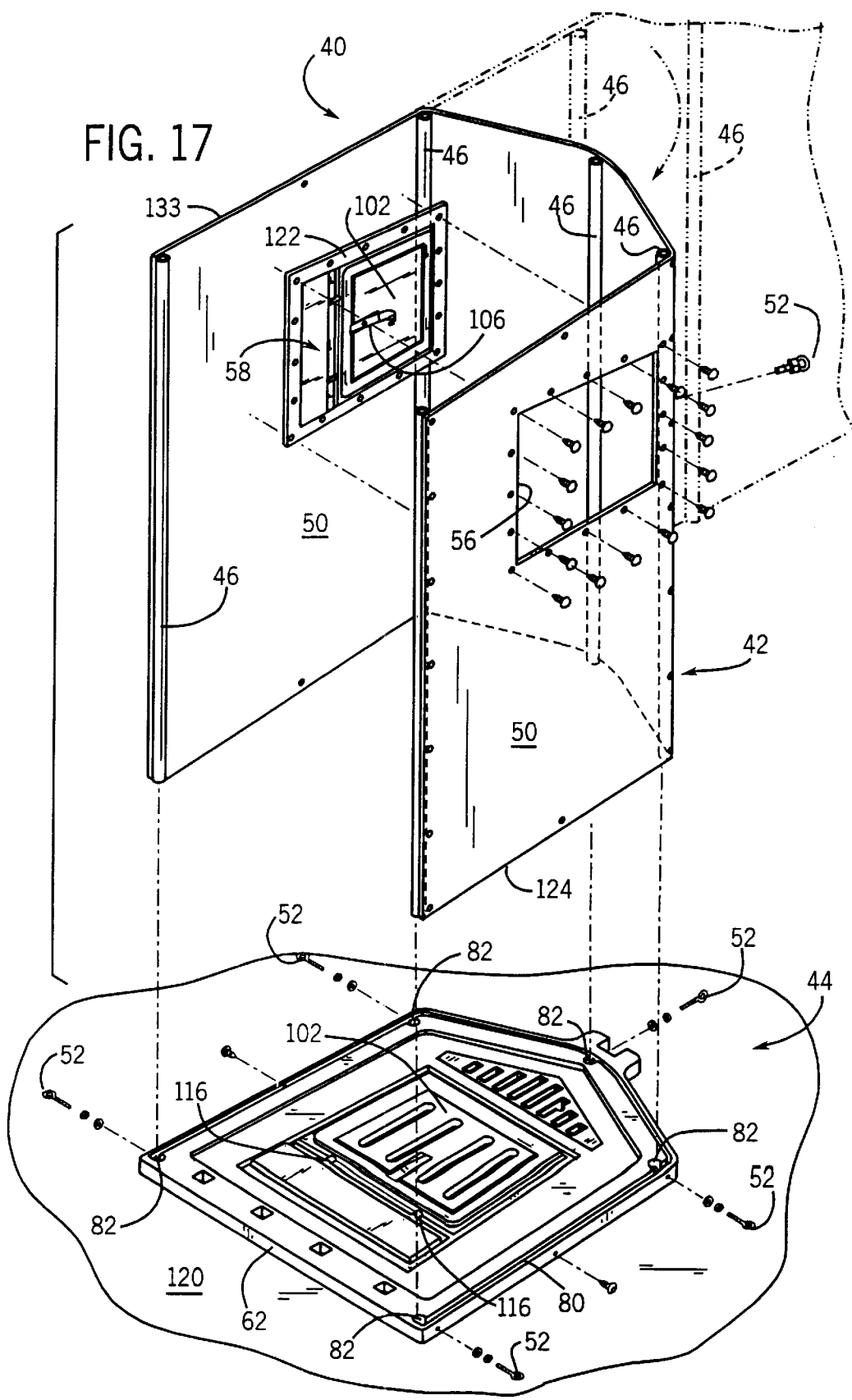

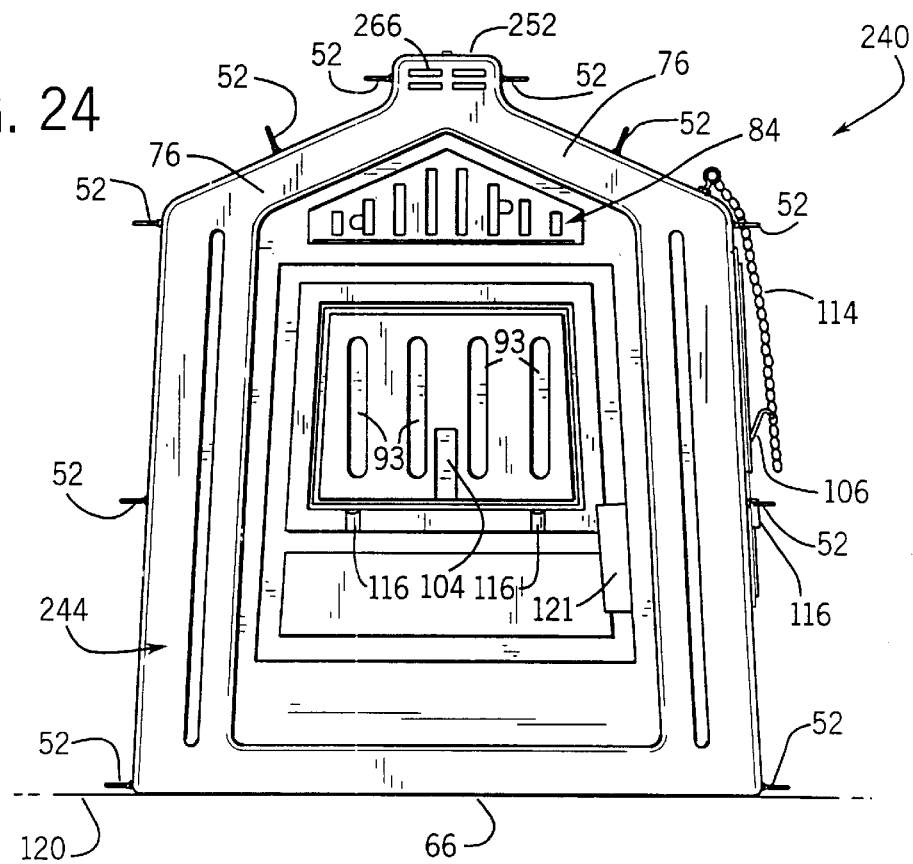
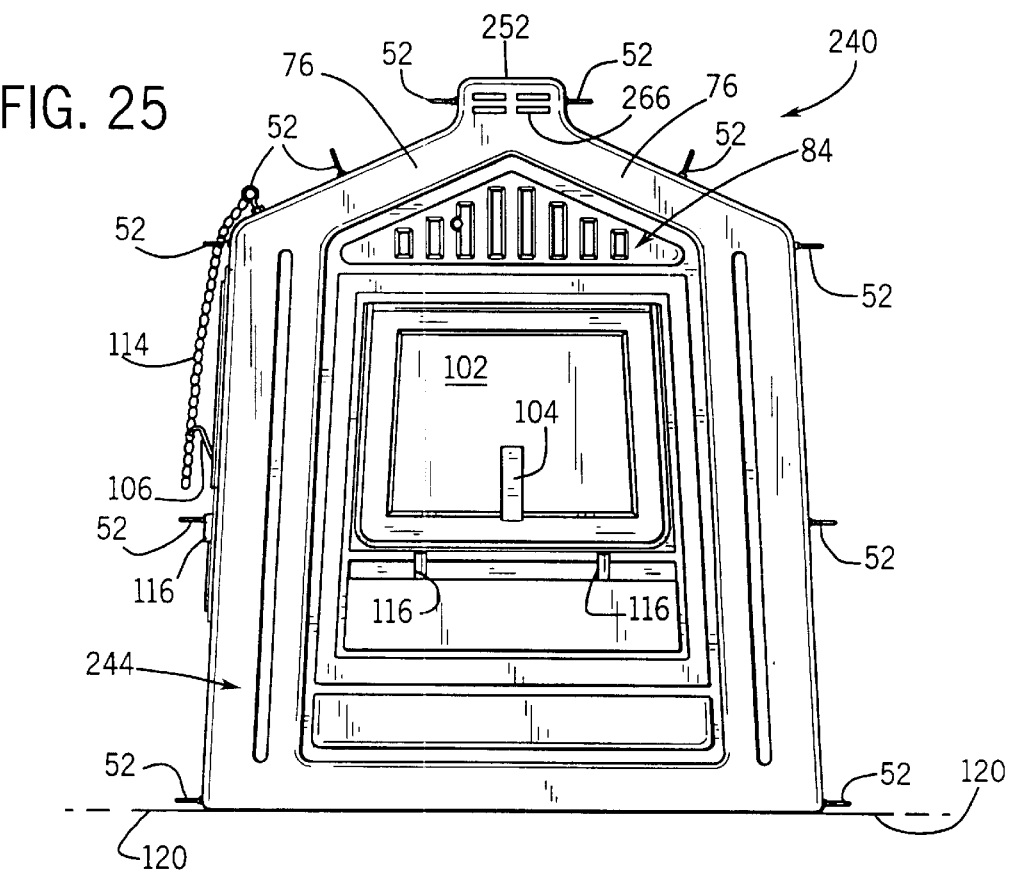

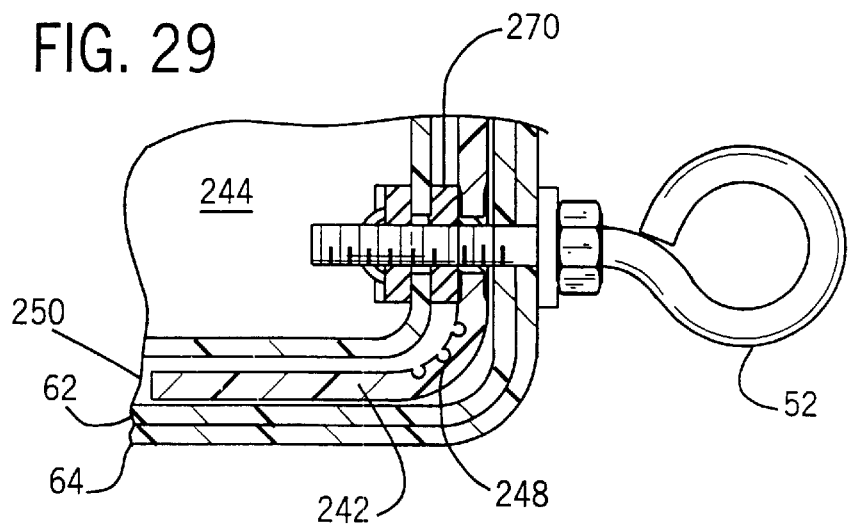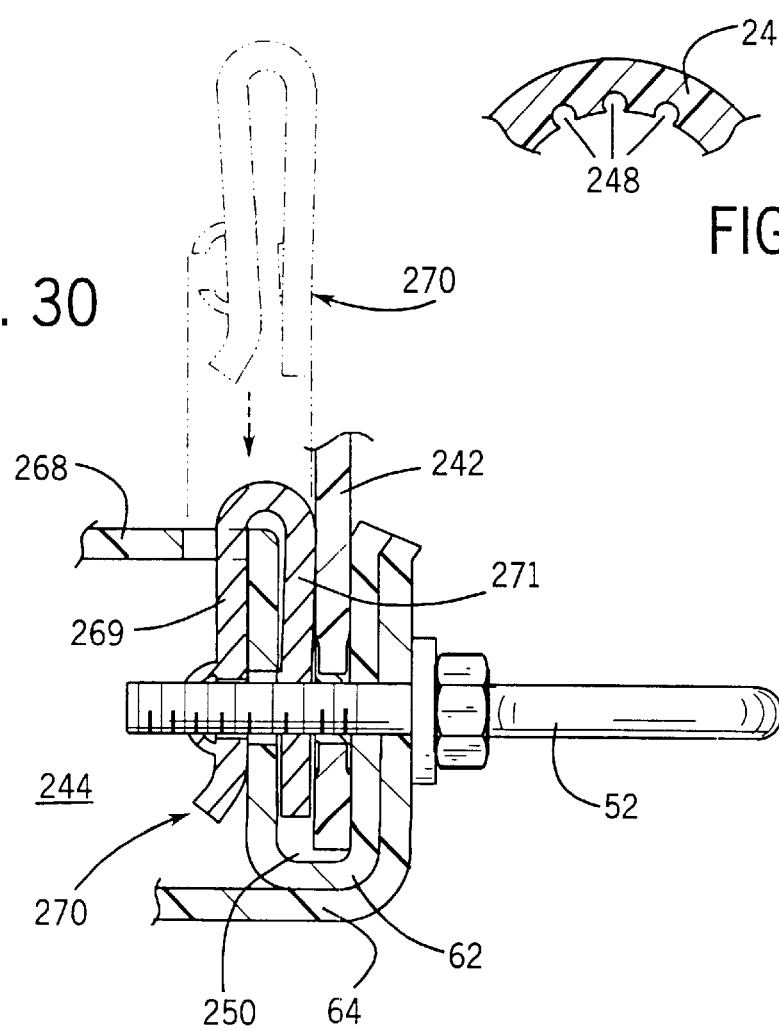

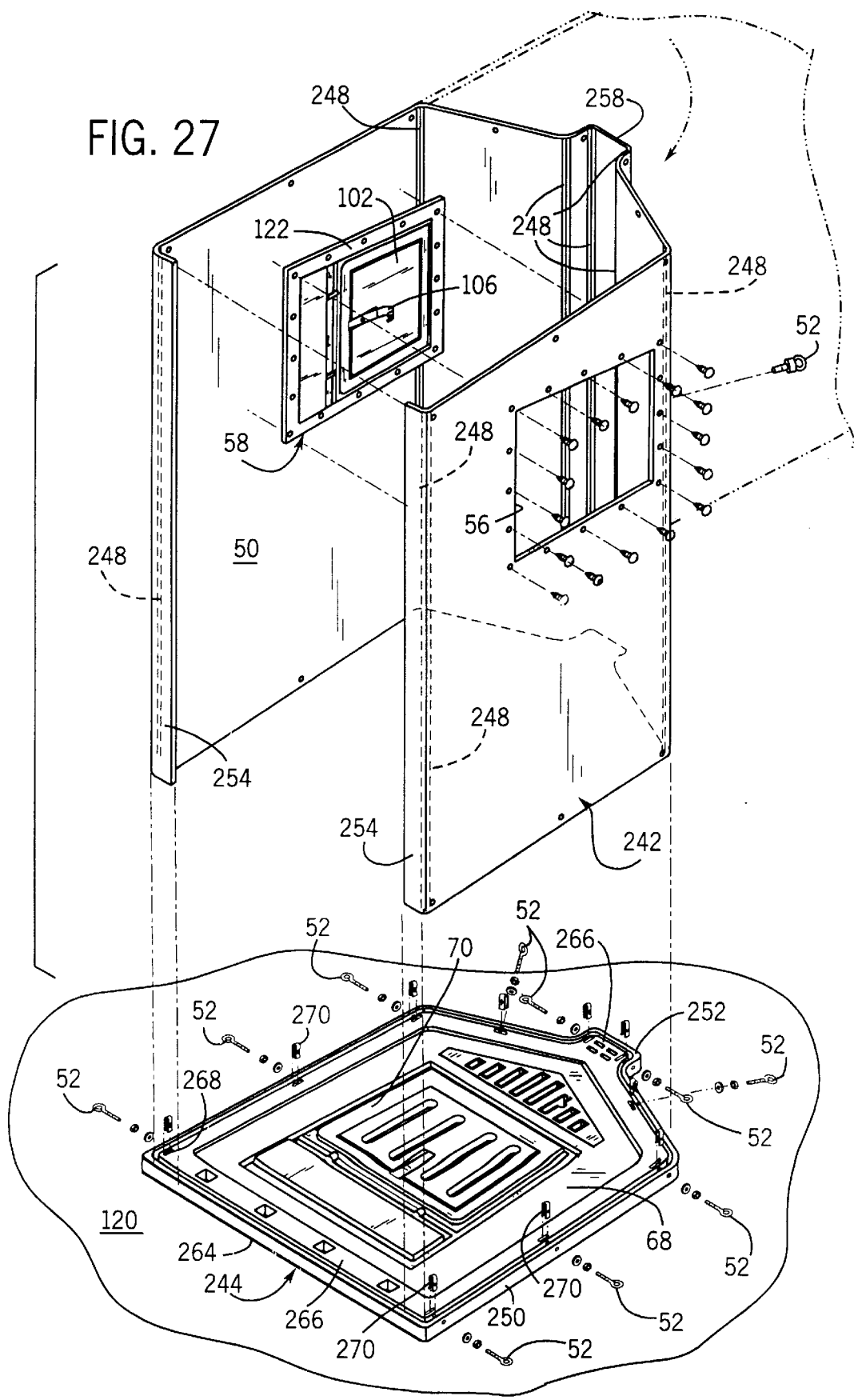

RESIN HUTCH AND METHOD OF ASSEMBLY

CROSS REFERENCE TO RELATED APPLICATIONS

This application claims the benefit of provisional application serial No. 60/154,997, filed Sep. 21, 1999.

STATEMENT REGARDING FEDERALLY SPONSORED RESEARCH OR DEVELOPMENT (Not Applicable)

BACKGROUND OF THE INVENTION

1. Technical Field

The present invention relates to shelter structures for animals, in particular, to a plastic resin hutch and an assembly kit.

2. Description of the Related Art

There are a number of known structures for sheltering livestock and other outdoor animals, such as cows, hogs, goats and sheep, from inclement weather. Young animals in early stages of development, such as calves, are especially prone to illness and need to be sheltered from the wind, rain and cold temperatures common in farming regions throughout the world, such as the mid-west region of the United States. Similarly, animals need protection from heat and direct sunlight in arid regions of the world. Keeping young animals in a dry, sheltered environment improves the health and speeds growth of the animals.

Typically, existing shelters are pre-formed of fiberglass or plastic molded in one piece to form rectangular or domed tent-like structures. These shelters typically include ends with openings for the animal's ingress and having side or end openings for ventilation and/or for attaching water and feed containers. Also, these shelters are typically bottomless tapering slightly from bottom to top so that they may be nested within one another for transport or storage. However, these shelters must be shipped by a private carrier because they do not meet the size limitations of commercial couriers or the U.S. Postal Service.

Existing shelters may also include doors, shutters or curtains for closing the openings. Typically, the doors are separate components hinged or pivotally attached to the shelter. These doors must be molded separately and installed over the appropriate openings, which increases the assembly time for the manufacturer or the consumer and also increases material costs as hinges and attachment hardware must be provided.

Accordingly, there exists a need for an animal shelter that is readily shippable by common commercial couriers and yet is easily assembled.

SUMMARY OF THE INVENTION

The present invention provides an improved shelter structure and method of assembly. The structure is formed of a plastic resin material having a flexible cover extending between two rigid end panels. The structure is assembled easily and is readily shippable by common commercial couriers.

As mentioned, the present invention includes a method of assembling a plastic resin structure having a flexible cover extending between first and second rigid ends. The structure is assembled by laying the first rigid end on a generally flat surface with a groove extending along a portion of the perimeter of the first rigid end opening away from the surface. Then, a first end edge of the flexible cover is inserted into the groove of the first rigid end and fastened to the first rigid end. The second rigid end is then placed over a second end edge of the flexible cover so that the second end edge is inserted into a perimeter groove of the second rigid end, and the cover is fastened in place. Then, the resin structure is pivoted about a bottom edge of the first rigid end so that the first and second rigid ends rest on the flat surface at essentially a right angle.

The structure of the present invention can be formed with or without support rods. If rods are used, the method further includes inserting a first end of at least one rod into a recess in the first rigid end and placing the second rigid end over the at least one rod so that a second end of the at least one rod is inserted into a recess in the second rigid end. In this way, the rods support the flexible cover, either by resting the cover on top of the rods or by fastening the cover to the rods, which may be inside or outside the cover.

If no rods are used, the apparatus and method of assembly of the present invention further include bending the flexible cover along longitudinal kerf grooves or cuts so as to form the cover to the contour of the grooves of the first and second rigid ends. Here, the first and second rigid ends have an upstanding tab at a top with a groove at its perimeter for receiving a portion of the respective first and second end edges of the flexible cover. When inserted into the ends, the cover defines a longitudinal channel at the top and turned in longitudinal bottom edges. The channel and curved bottom edges give structural integrity to the structure.

In either case, the apparatus includes an entry (and exit) opening in one rigid end and a feed door panel at the other end. A feed door panel may also be inserted into an opening in the side of the cover. If so, the side feed door panel may be cut out from the rigid end forming the entry opening.

The ends are formed of two walls fused together at some locations and separated at other locations to form a door panel. A portion of the walls are cut to define a door integrally attached to the door panel at a living hinge without the door being separated from the door panel. Specifically, the first and second walls are separated along a door perimeter such that a portion of the second wall extending along the entire door perimeter and a portion of the first wall extending along all but one side of the door perimeter can be removed to define a door made of the first and second walls that is integrally hinged to the door panel. The door terminates at its edges in a lip comprised of the first wall sized to overlap a door opening rim made of the second wall.

Additionally, the door of the side and/or end door panel includes a slot at a free end of the door extending from the second wall diagonally through the first wall for receiving a latch slidable within the slot for retaining the door in close proximity to the door panel. The apparatus and assembly method may include an eye-bolt fastened above the door at either the end or side door panel for securing a flexible line attached to the latch for propping the door open.

The structure also includes at least one feed container basket mount molded to be integral with the door panel at either or both of the first and second walls. The feed container basket mount defines an elongated aperture for receiving a hooked end of a wire-frame feed container basket. Also, the door panel includes raised members beneath the feed container basket mounts projecting out of the door panel to keep a feed container disposed in the feed container baskets substantially level.

Another aspect of the present invention is that it can be made to be conveyed before assembly in two shipping packages of acceptable size and weight to be transported by commercial package carriers. The first shipping package contains the flexible cover rolled in a concentric spiral and a plurality of support rods, if used, fastened to the rolled flexible cover. The first package also contains any animal feed/water containers. The second package contains the end panels and any miscellaneous hardware, such as the latches.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 5 is a front plan view of an end panel before the door panel and vents are cut out, showing the door panel and vents in phantom;

FIG. 6 is a front plan view of the door panel and vents before the door panel is cut out, showing the vents in phantom;

FIG. 11 is a front plan view of a door panel showing the cut lines in the outside wall for cutting the door from the door panel;

FIG. 12 is a back plan view of the door panel of FIG. 11, showing the cut line in the inside wall for cutting the door from the door panel;

FIG. 14 is a cut-away cross-sectional view taken along line 14—14 of FIG. 11, showing in phantom the material cut away at the cut lines of FIGS. 11 and 12;

FIG. 16 is a cut-away cross-sectional view taken along line 16—16 of FIG. 12, showing feed containers mounted to the door panel;

FIG. 17 is an exploded partial assembly view of the resin hutch of FIG. 1;

FIG. 20 is a cut-away cross-sectional view taken along line 20—20 of FIG. 18, showing one connection of the cover to an end panel and a support rod;

FIG. 24 is a front plan view of the resin hutch of FIG. 23;

FIG. 25 is a rear plan view of the resin hutch of FIG. 23;

FIG. 26 is a cut-away cross-sectional view taken along line 26—26 of FIG. 28, showing the longitudinal kerfs at one surface of the cover;

FIG. 27 is an exploded partial assembly view of the resin hutch of FIG. 23;

FIG. 29 is a cut-away cross-sectional view taken along line 29—29 of FIG. 28, showing one connection of the cover to an end panel; and FIG. 30 is a cut-away cross-sectional view taken along line 30—30 of FIG. 28, showing the connection of FIG. 29 of the cover to the end panel.

DETAILED DESCRIPTION OF THE PREFERRED EMBODIMENTS

Figure 1:
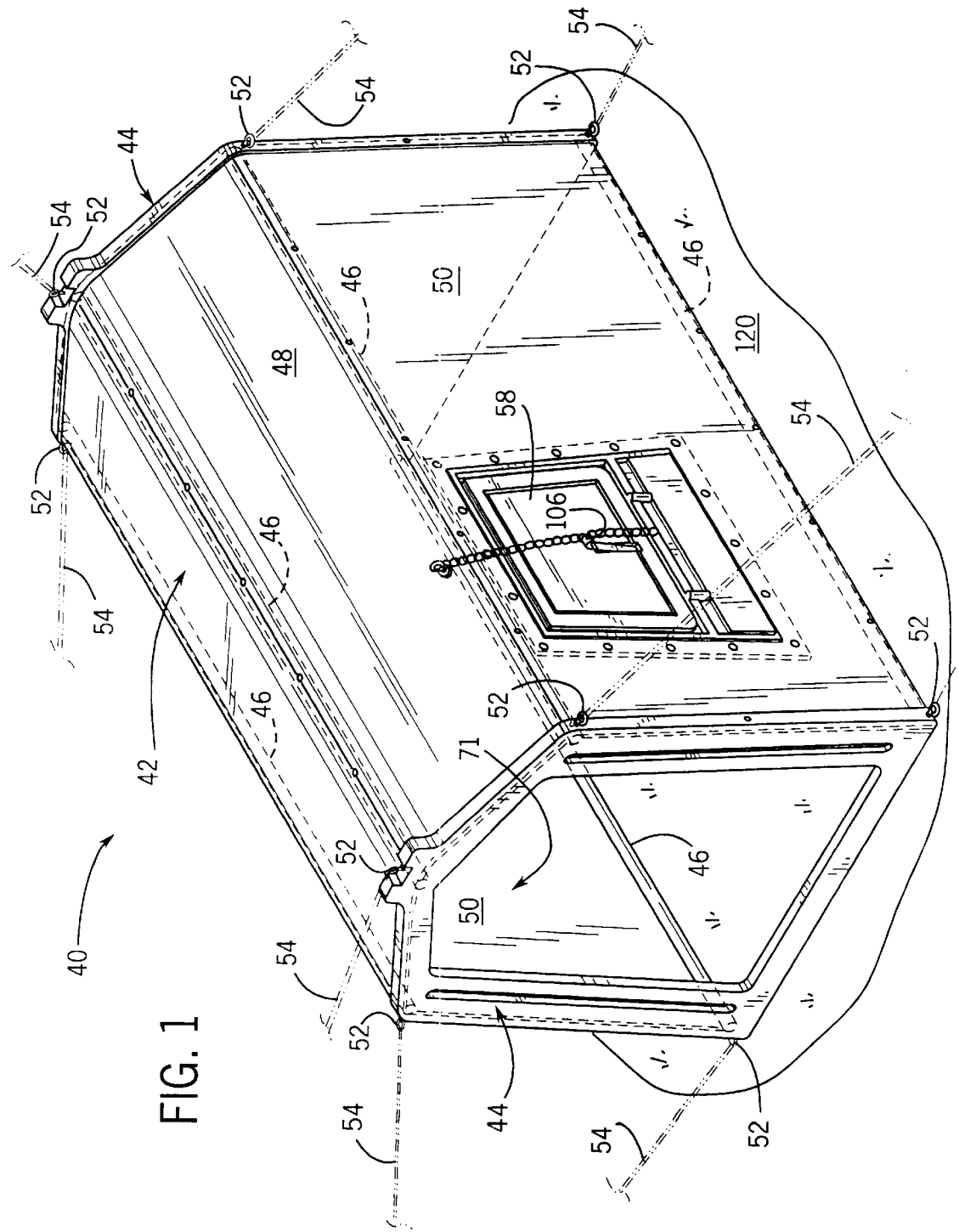
FIG. 1 is a perspective view of a first embodiment of the resin hutch of the present invention.

Throughout the several figures of the drawings, the resin hutch of the present invention is generally designated by reference number 40. Referring to FIG. 1, the first embodiment of the present invention includes as primary components a flexible cover 42, two rigid end panels 44 and support rods 46. Generally, the support rods 46 extend longitudinally between the end panels 44 and the cover 42 is bent over the rods 46 to form the top 48 and sides 50 of the hutch 40. The cover 42 is fastened to the rods 46 by suitable fasteners, such as ordinary rivets, and each longitudinal end of the cover 42 is fastened to the end panels 44 by suitable fasteners, such as eye-bolts 52, the corners of the end panels 44. The eye-bolts 52 may be used for securing tether lines 54 staked to the ground or anchored to another structure for securing the hutch 40.

More specifically, the cover 42 is comprised of a single rectangular sheet of plastic resin, such as polypropylene, approximately ⅛" thick and having a longitudinal dimension preferably of four, five or six feet and a lateral dimension sufficient to form the top 48 and sides 50 of the hutch 40. Preferably, the cover 42 is opaque to shield sun-light and prevent high and widely fluctuating temperatures within the hutch 40. The cover 42 is sufficiently flexible to bend around the support rods 46 and define the top 48 and sides 50 of the hutch 40. Also, the cover 42 is flexible enough to be wound into a roll for storage or transport.

Figure 2:
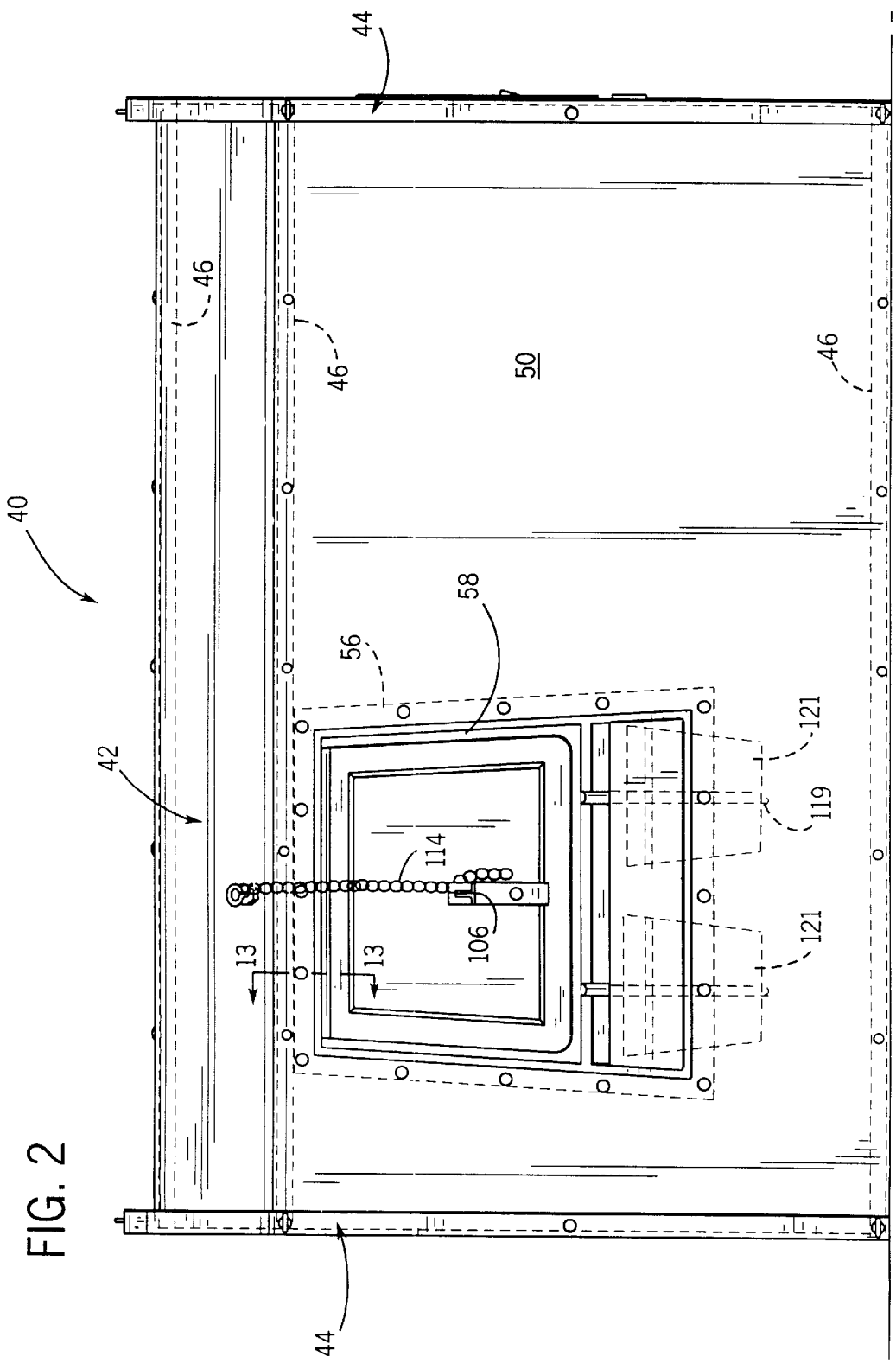
FIG. 2 is a side plan view of the resin hutch of FIG. 1, showing a side feed door with attached feed buckets in phantom.

Referring to FIGS. 1, 2, and 17, the cover 42 may include an opening 56 in which a side feed door panel 58 (described in detail below) may be inserted and fastened to the cover 42. The opening 56 is generally trapezoidal with the base at the bottom. The opening 56 may be located in any suitable position, such as front, middle or rear, so that when the cover 42 is assembled to the end panels 44 the opening 56 is at either side 50 of the hutch 40. Bores are disposed about the perimeter of the opening 56 to receive suitable fasteners.

Referring to FIGS. 1 and 17, the support rods 46 are standard metal conduit having an approximately ¾" outer diameter. There are five such rods 46 longitudinally fastened to the cover 42, one along each lateral end at the bottom of the hutch 40, one at the mid-point at the top, and one approximately 14" on each side of the top rod 46 where the top joins the sides. The rods 46 are positioned to be proximate the five corners of the end panels 44 when the cover 42 is assembled. Although the figures show the hutch 40 having five rods 46, the invention is not limited in this regard as a hutch having more, less or no rods is also within the scope of the invention. For example, the hutch may have only three rods 46, one at the top center and two along the bottom at the lateral ends. In this case, the rods 46 would be positioned proximate only three (top center and two bottom) corners of the five corners of the end panels 44.

Figure 3:
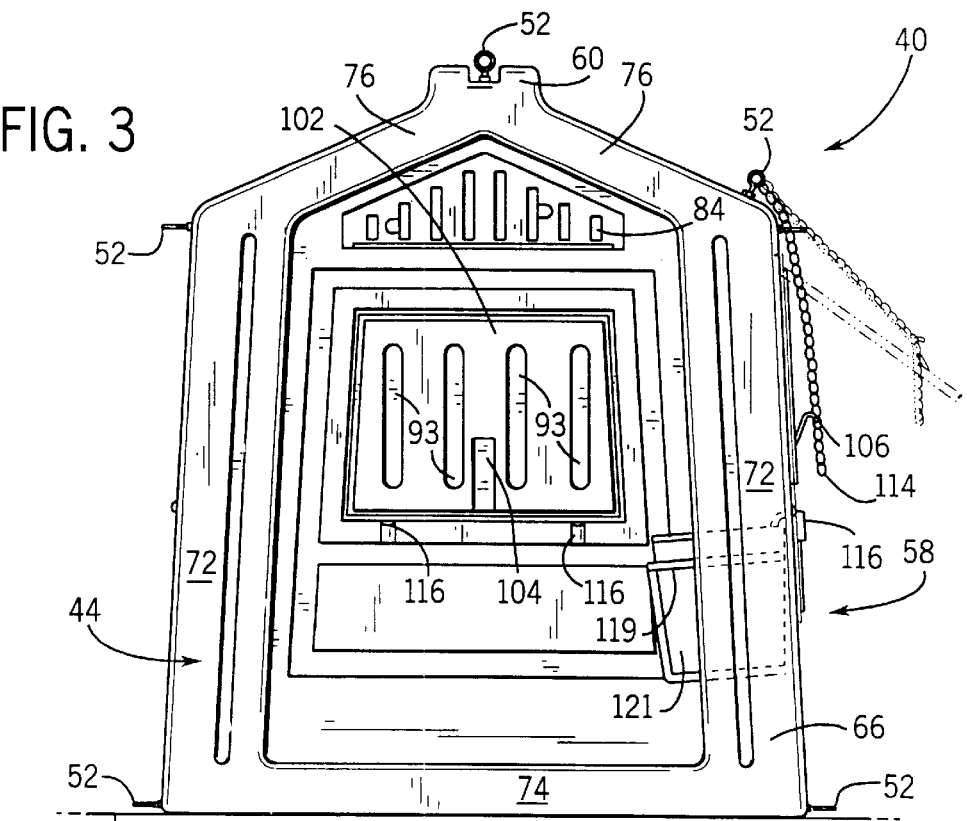
FIG. 3 is a front plan view of the resin hutch of FIG. 1, showing feed containers at a side.
Figure 4:
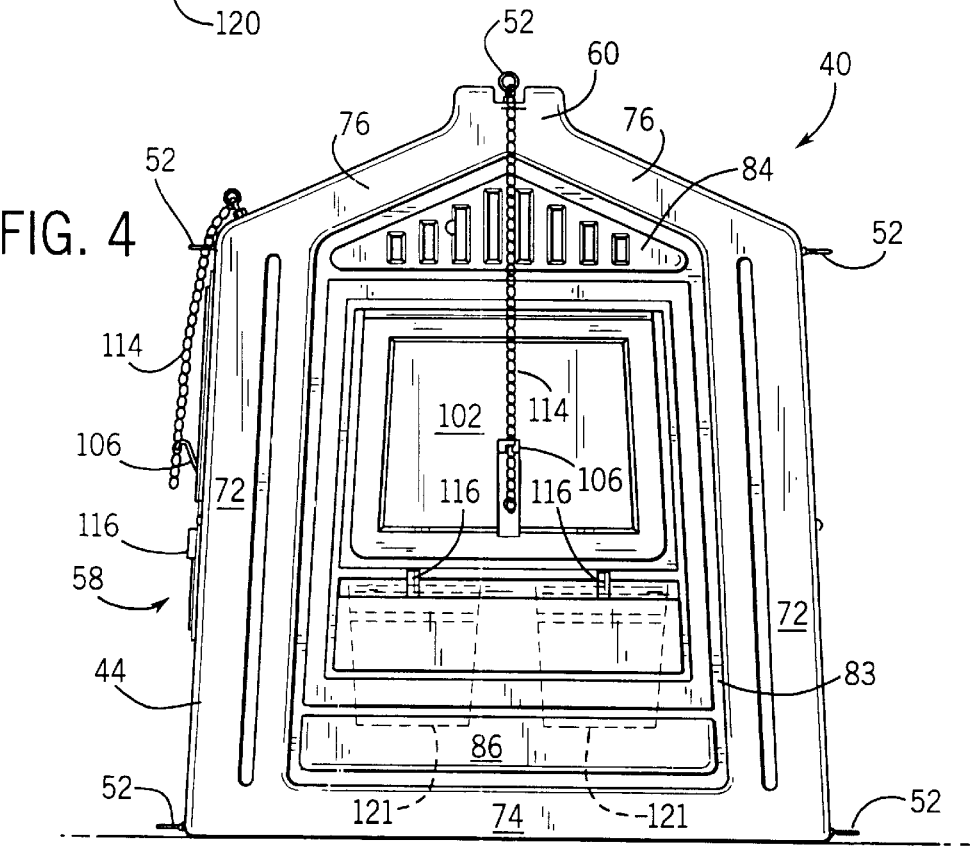
FIG. 4 is a rear plan view of the resin hutch of FIG. 1, showing feed containers in phantom at the rear end.

Referring now to FIGS. 3 and 4, the end panels 44 are generally five-sided, tapering inward slightly from bottom to top, angling in at the top to a tab 60 at the lateral mid-point of the end panel 44. The longitudinal dimension of the panels 44 is slightly more than an inch. The end panels 44 are formed of a known vacuum thermo-forming process molding two plastic resin sheets, such as a high density, heavy gauge polypropylene. The present invention is not limited in this regard, however, as the end panels 44 may be formed of any suitable resin using any suitable technique, such as blow molding or roto-molding processes known in the art. Prior to being cut, as described below, the end panels 44 are identical. Thus, the end panels 44 are comprised of two walls, an inside wall 62 and an outside wall 64 (shown for example in FIG. 8), formed so as to be fused at some locations and separated from each other at other locations. Since the end panels 44 are comprised of two walls 62, 64, the end panels 44 are molded to have an inside surface different from an outside surface. For example, certain locations of the inside wall 62 are recessed while other locations are embossed, and the same is true for the outside wall 64.

Referring to FIGS. 5–6, as molded the end panels 44 can be described as having three segments, a frame portion 66 (shown in solid lines in FIG. 5), a vent panel portion 68 (shown in hidden lines in FIG. 6) and a door panel portion 70 (shown in solid lines in FIG. 6). One end panel 44 of the hutch 40 includes all three portions, however, one end panel 44 has the vent 68 and door 70 panel portions cut out from the frame portion 66, which defines an entrance and exit opening 71 to the hutch 40 for the animals. If the hutch 40 is to include a side feed door 58, then the door panel portion 70 is cut out from the vent panel portion 68 and fastened to the opening 56 in the cover 42 at bores spaced about its perimeter (see FIG. 2). Any suitable means can be used to cut out the vent 68 and door 70 panel portions, for example, an electric router.

Referring to FIG. 5, the frame portion 66 defines the outer perimeter of the end panels 44, including two side members 72 separated at the bottom by a bottom member 74 and at the top by two top members 76 forming an inclusive obtuse angle. At the apex of the frame where the two top members intersect is the tab-like member 60 having a longitudinal channel 78 in which an eye-bolt fastener 52 is disposed.

Referring briefly to FIG. 17, the inside wall 62 of the frame portion 66 defines a recessed groove 80 extending proximate the perimeter of the top 76 and side 72 members. The inside wall 62 also defines five circular recesses 82 positioned adjacent to the groove 80 proximate the five corners of the frame portion 66. The circular recesses 82 are positioned and sized to receive the ends of the support rods 46 when assembled. Other recesses are formed in the inside 62 and outside 64 walls of the frame portion for added structural support, as shown in FIGS. 5 and 17.

Referring again to FIGS. 5 and 6, the vent panel portion 68 and the frame portion 66 meet at the inside perimeter of the frame portion 66 in channel 83 which surrounds the vent panel portion 68. The inside 62 and outside 64 walls are fused together in channel 83. As mentioned, for the entrance, the end panel 44 is cut along the inside perimeter of the frame portion 66 to provide the opening 71 through which the animals may enter and exit the hutch 40. After the cut is made, the inside edges of the frame 66 remain fused together. On the other end panel, the vent 68 and door 70 panel portions remain intact, except that cuts are made to create vents and a door as explained below.

The vent panel portion 68 has a similar five-sided outer perimeter as the frame portion 66, although without the tab member 60. The inside 62 and outside 64 walls are fused together along the outside perimeter of the vent panel portion 68 in channel 83 as well as at the top and bottom of the door panel portion 70 in channels 85 and 87. The fused walls outline an air vent 84 at the top and an embossed lateral member 86 at the bottom.

Figure 9:
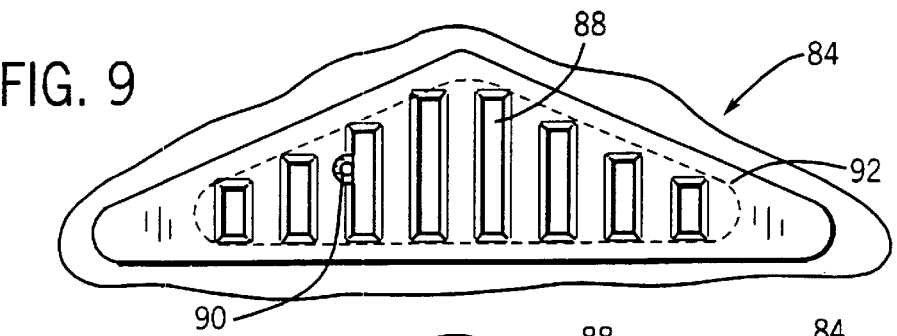
FIG. 9 is a cut-away front plan view of the vent in an open position.
Figure 10:
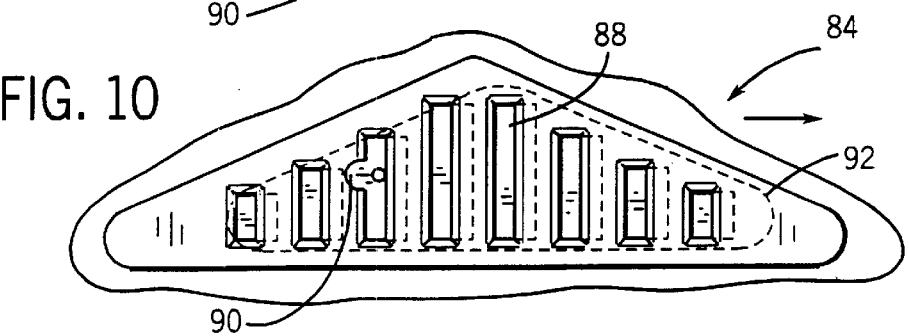
FIG. 10 is a cut-away front plan view of the vent in a closed position.
Figure 7:
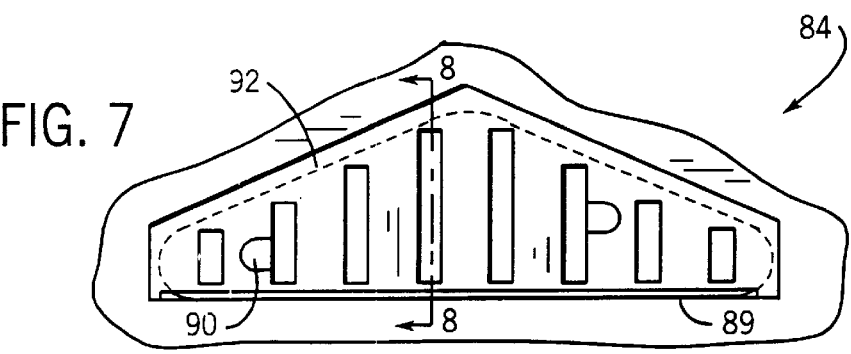
FIG. 7 is a cut-away back plan view of the vent, showing the cut line for inserting the vent louver.
Figure 8:
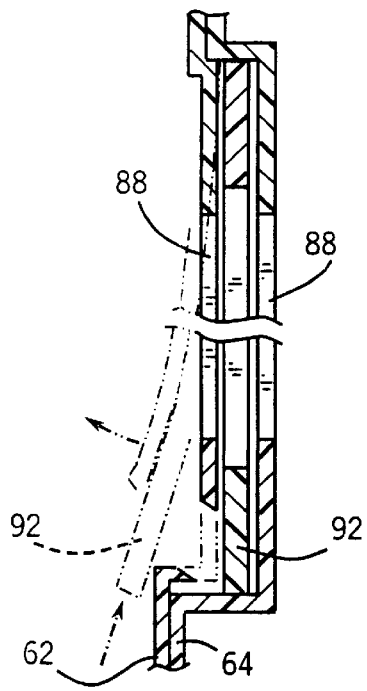
FIG. 8 is a cross-sectional view taken along line 8—8 of FIG. 7, showing the vent louver being inserted into the end panel wall at the vents.

Referring to FIGS. 7–10, the vent 84 is defined by a generally triangular portion at most of which the inside 62 and outside 64 walls are separated. However, the inside 62 and outside 64 walls are molded to be fused at variously sized transverse segments 88. These segments 88 are cut out to define transverse openings, as are semi-circular slots 90 adjacent to selected transverse segments 88. Referring particularly to FIGS. 7 and 8, a lateral opening 89 is made in the inside wall 62 of the end panel 44 beneath the transverse segments 88 to allow a triangular vent louver 92 (shown in phantom in FIGS. 7, 9 and 10) to be inserted between the inside 62 and outside 64 walls by flexing the inside wall 62 inwardly away from the outside wall 64. The vent louver 92 includes transverse openings corresponding to those in the end panel 44 when it is inserted. As shown in FIG. 9, when the transverse openings of the louver 92 and the vent 84 align, the vent 84 is open to allow air to pass through the end panel 44. Referring to FIG. 10, when the vent louver 92 is repositioned sufficiently, the vent is closed. The vent louver 92 can be controlled by inserting a finger in the circular slot 90 and sliding it laterally.

Figure 13:
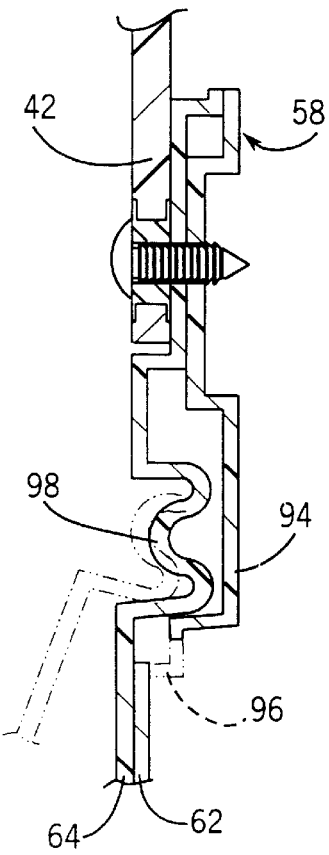
FIG. 13 is a cut-away cross-sectional view taken along line 13—13 of FIG. 2, showing the flexing of the integral living hinge maintaining the connection of the door to the door panel after the material is removed at the cut lines of FIGS. 12 and 13.

Referring now to FIGS. 11 and 12, the door panel portion 70 has a generally trapezoidal perimeter, tapering inwardly from bottom to top, at which the inside 62 and outside 64 walls are fused. The panel portion 70 is defined by cutting it out from an end panel 44 along the vertical legs of channel 83 and the horizontal channels 85 and 87, where the walls 62 and 64 are fused. Referring to FIGS. 12 and 13, the inside wall 62 defines a raised frame 94 stepping down to another frame 96, raised to a lesser extent and outlining a door perimeter 97. Referring to FIGS. 11 and 13, opposite the raised frame 94, a free-floating arcuate portion 98 extends along the top side of the door perimeter 97. The arcuate portion 98 extends between a segment of the outside wall 64 fused to the inside wall 62 above the raised frame 94 and an outside wall segment fused to the inside wall 62 below the stepped down frame 96. And, at the bottom and sides of the door perimeter 97, the outside wall 64 defines a raised portion 100 opposite the stepped down frame 96 of the inside wall. The walls 62 and 64 are also fused in a perimeter door panel flange 122 in the horizontal channel segments 91, in recesses 93 and at the edges outward of raised portion 100 and inward of the stepped down frame 96.

Referring to FIG. 14, a door 102, formed of the inside 62 and outside 64 walls, is defined by removing the stepped down frame 96 of the inside wall 62 and the raised portion 100 of the outside wall 64, as shown by the cut lines (in phantom) of FIGS. 11, 12 and 14. The arcuate portion 98 above the door 102 acts as an integral, living hinge 101 allowing the door 102 to pivot thereabout. When the cuts are made to separate the door 102, the door 102 has a perimeter defining a lip 103 made of the outside wall 64 which overlaps a perimeter rim 109 of the inside wall 62. The cut out door 102 can pivot about the living hinge 101 to open outwardly.

Figure 15:
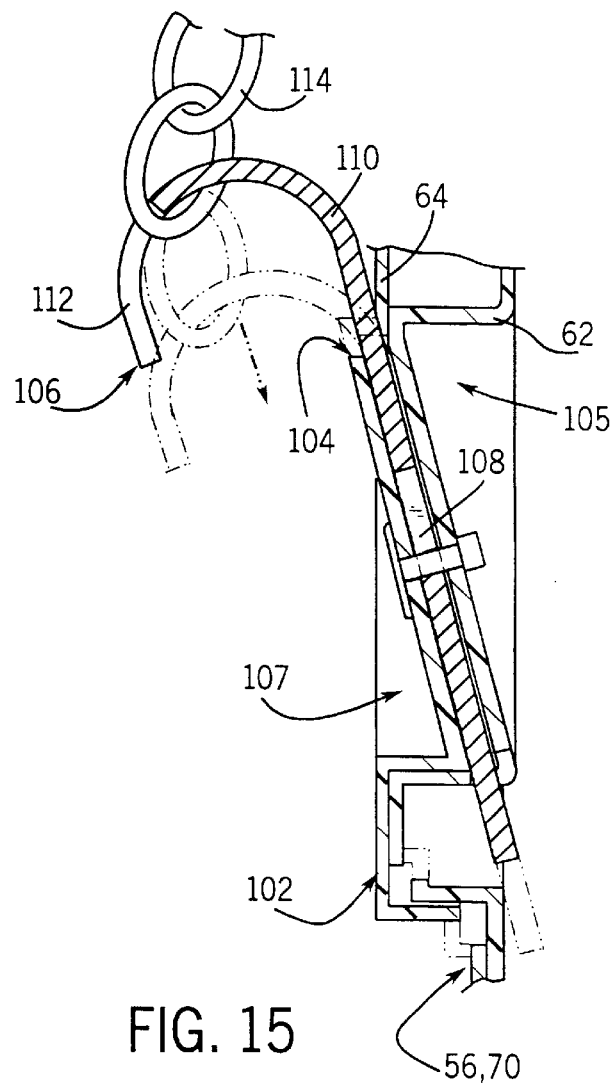
FIG. 15 is a cut-away cross-sectional view taken along line 15—15 of FIG. 11, showing the door latching mechanism.

Referring to FIGS. 11, 12 and 15, at the bottom center of the end panel 44 and/or side feed 58 doors 102, the inside 62 and outside 64 walls define a latch-receiving slot 104 extending diagonally inwardly such that wedge-shaped recesses 105, 107 are formed proximate the top and bottom of the latch slot 104 in the inside 62 and outside 64 walls, respectively. Lateral cuts are made in the outside wall 64 at the top of the latch slot 104 and in the inside wall 62 at the bottom of the latch slot 104 so that the shaft of a cane-shaped latch 106, formed from a flat strip of steel, can be inserted into the slot 104. The latch 106 is longer than the slot 104 so that it can be inserted through the slot 104 and below the door 102 so as to prevent the door 102 from opening. Preferably, the latch 106 includes a transverse slot 108 receiving a fastener for slidably fixing the latch 106 to the door 102. A hook portion 110 of the latch 106 includes a groove 112 at which a chain link 114 or other line may be secured to the latch 106.

Referring to FIGS. 11, 12 and 16, the inside 62 and outside 64 walls each define two transverse feed basket mounts 116 located below the door 102 and generally shaped to define vertical cylinders. The inside 62 and outside 64 walls each define a raised lateral surface 118 below and substantially flush with the feed basket mounts 116. The feed basket mounts 116 receive hooked ends 117 of wire frame feed baskets 119 which hold bowl-shaped feed/water containers 121.

Figure 18:
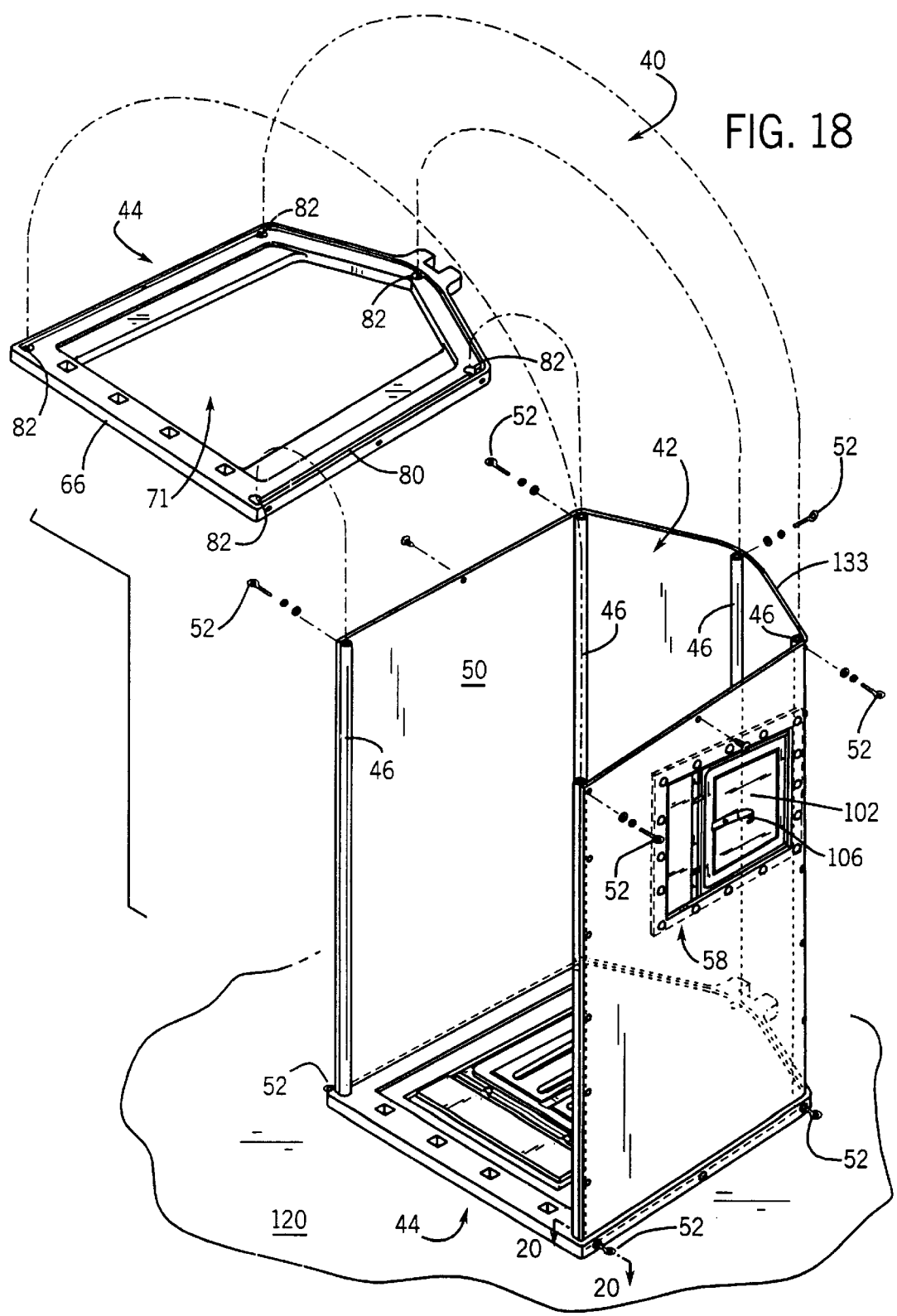
FIG. 18 is an exploded partial assembly view of the resin hutch of FIG. 1.
Figure 19:
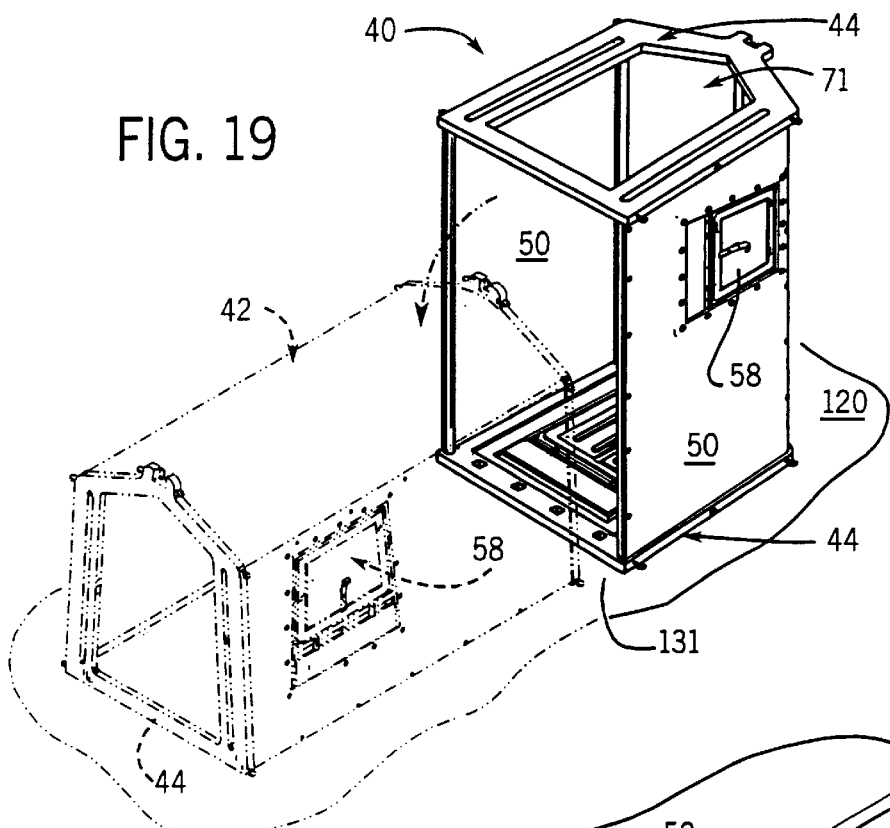
FIG. 19 is a perspective view of the resin hutch of FIG. 1, showing the hutch positioned for use in phantom.

FIGS. 17–19 illustrate a preferred method of assembling the first embodiment of the hutch 40. Referring to FIG. 17 specifically, one of the end panels 44 is laid outside face down on an essentially flat surface 120, such as a floor or the ground, so that the groove 80 proximate the perimeter of the end panel 44 opens upward. The cover 42 is then unrolled and laid flat on the flat surface 120 with the support rods 46 facing upward. If the cover 42 includes a side feed door opening 56, the side feed door panel 58 is inserted into the opening 56 with the perimetral door panel flange 122 being larger than the opening 56 and making contact with the inside of the cover 42. The side feed door panel 58 is then fastened to the cover by suitable fasteners disposed in bores at the perimeter of the side feed door opening 56.

Then, the cover 42 is bent into a U-shape with the support rods 46 on the inside and one longitudinal end 124 of the cover 42 is placed in the groove 80 and the ends of the support rods 46 are placed in the circular recesses 82 proximate the ends and corners of the groove 80. As shown in detail in FIG. 20, the threaded eye-bolts 52, generally in the plane of the end panel 44, are disposed in bores in the side edge 126 of the end panel 44 and threaded into inserts 128 disposed in threaded bores 129 proximate the ends of the rods 46. The eye-bolts 52 are tightened to secure the end panel 44 to the cover 42 and rods 46.

Referring to FIG. 18, the remaining end panel 44 is then placed outside face up onto a free longitudinal end 133 of the cover 42 so that it fits into the end panel groove 80 and the rods 46 fit in the circular recesses 82. The end panel 44 is secured in place with eye-bolts 52 as described above with respect to the first assembled end panel 44. Referring to FIG. 19, the hutch 40 is pivoted on a bottom edge 131 of the first end panel 44 and then set down onto the flat surface 120 with the end panels 44 being substantially perpendicular to the flat surface 120.

Figure 21:
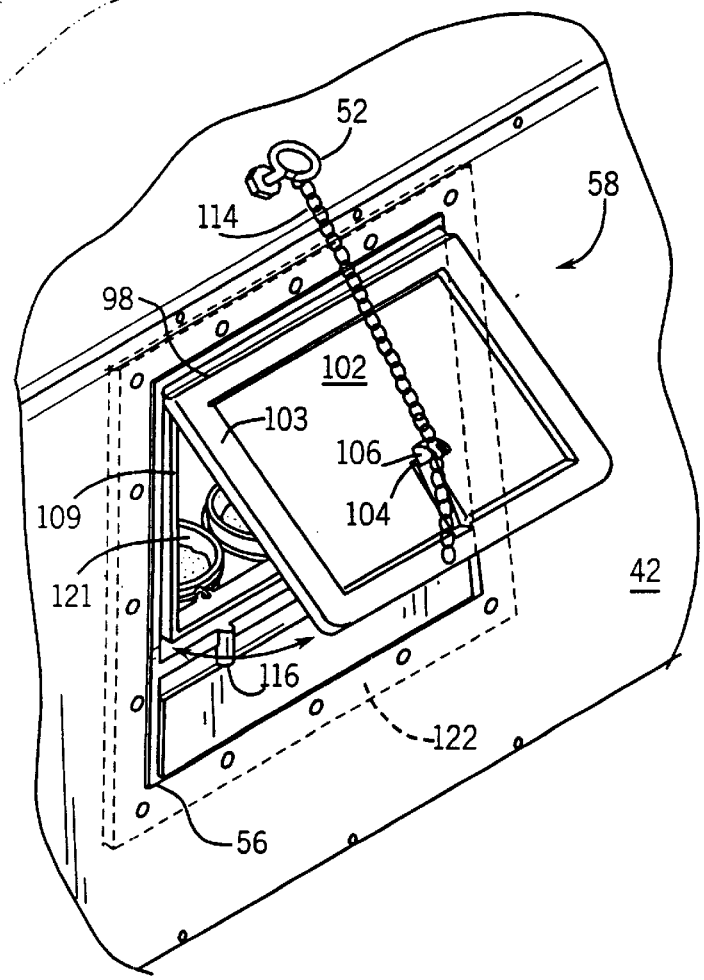
FIG. 21 is a cut-away perspective view of an assembled side door panel.

Referring again to FIG. 2, an extra eye-bolt 52 is secured to the support rod 46 proximate the mid-point of the top of the side feed door panel 58 and a length of rope or chain 114 is secured at one end to the eye-bolt 52 and at the other end (or other portion of the chain/rope lift) to the door latch 106. Similarly, a length of rope or chain 114 may be secured to the top center eye-bolt 52 of the end panel 44 having the door panel portion 70. The rope or chain 114 can then be used to prop the side and/or end feed door 102 open to allow access to the feed containers from outside the hutch 40, as shown in FIG. 21.

Referring to FIGS. 3, 12 and 16, the hooked ends 117 of wire-frame feed container baskets 119 are disposed into bores at the integral feed basket mounts 116 positioned transversely below the door 102 on either or both of the inside 62 or outside 64 walls. Finally, referring again to FIG. 1, the tether lines 54, comprised of nylon rope for example, may be secured to the eye-bolts 52 and staked into the ground or otherwise anchored to the floor.

Figure 22:
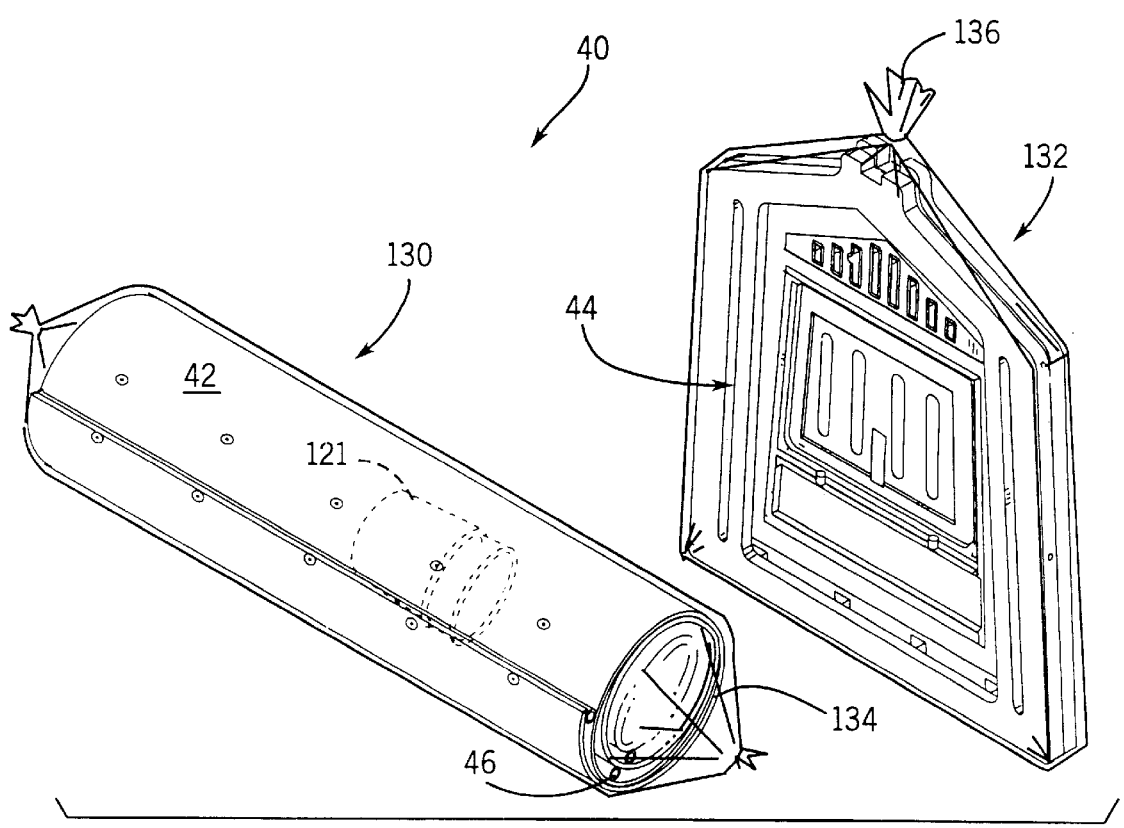
FIG. 22 is a perspective view of the cover, feed containers and support rods fit within one shippable package and the rigid ends fit within another shippable package.

Referring to FIG. 22, the hutch 40 is shipped from the manufacturer, with the support rods 46 properly fastened to the cover 42, in two packages 130, 132. One package 130 contains the cover 42 and rods 46 rolled about feed and water containers 121 wrapped in a plastic sleeve 134. The other package 132 includes the end panels 44 and miscellaneous assembly hardware, such as the eye-bolts 52, latches 106, and door panel fasteners in a suitably sized bag 136. The rolled package 130 containing the cover 42 has an approximately 12" diameter extending 4 to 6 feet in length and weighing approximately 35 lbs. depending upon the length of the hutch 40. The package 132 containing the end panels 44 is approximately 55"×40" and weighs approximately 19 lbs. together with the latch 106 and other hardware. Both packages 130, 132 meet the size and weight restrictions of common commercial couriers, such as United Parcel Service, Inc. and Federal Express, Inc., as well as the U.S. Postal Service. Thus, the hutch 40 of the present invention may be easily shipped, which speeds delivery time and reduces transportation costs.

Figure 23:
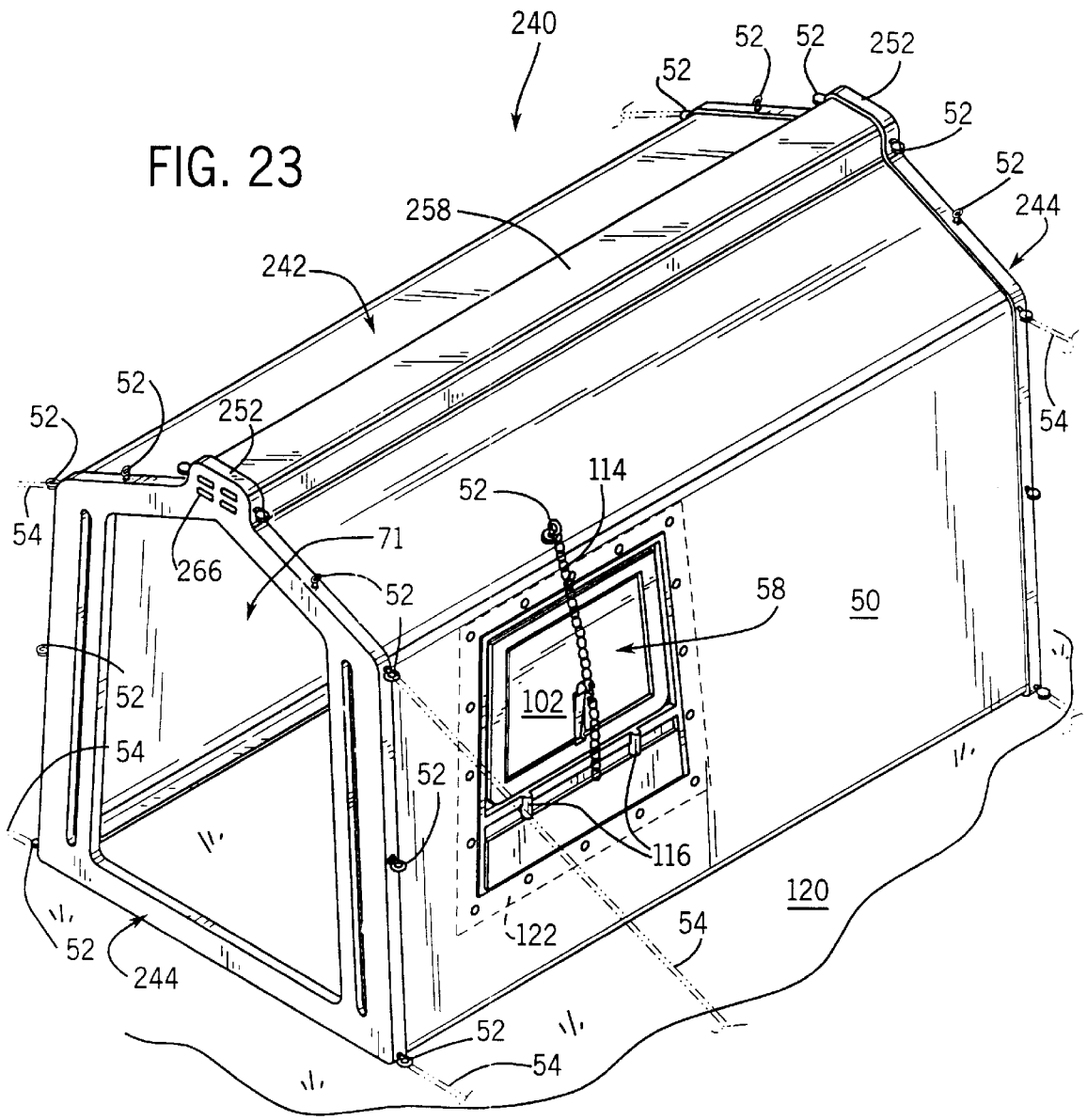
FIG. 23 is a perspective view of a second embodiment of a resin hutch of the present invention.
Figure 28:
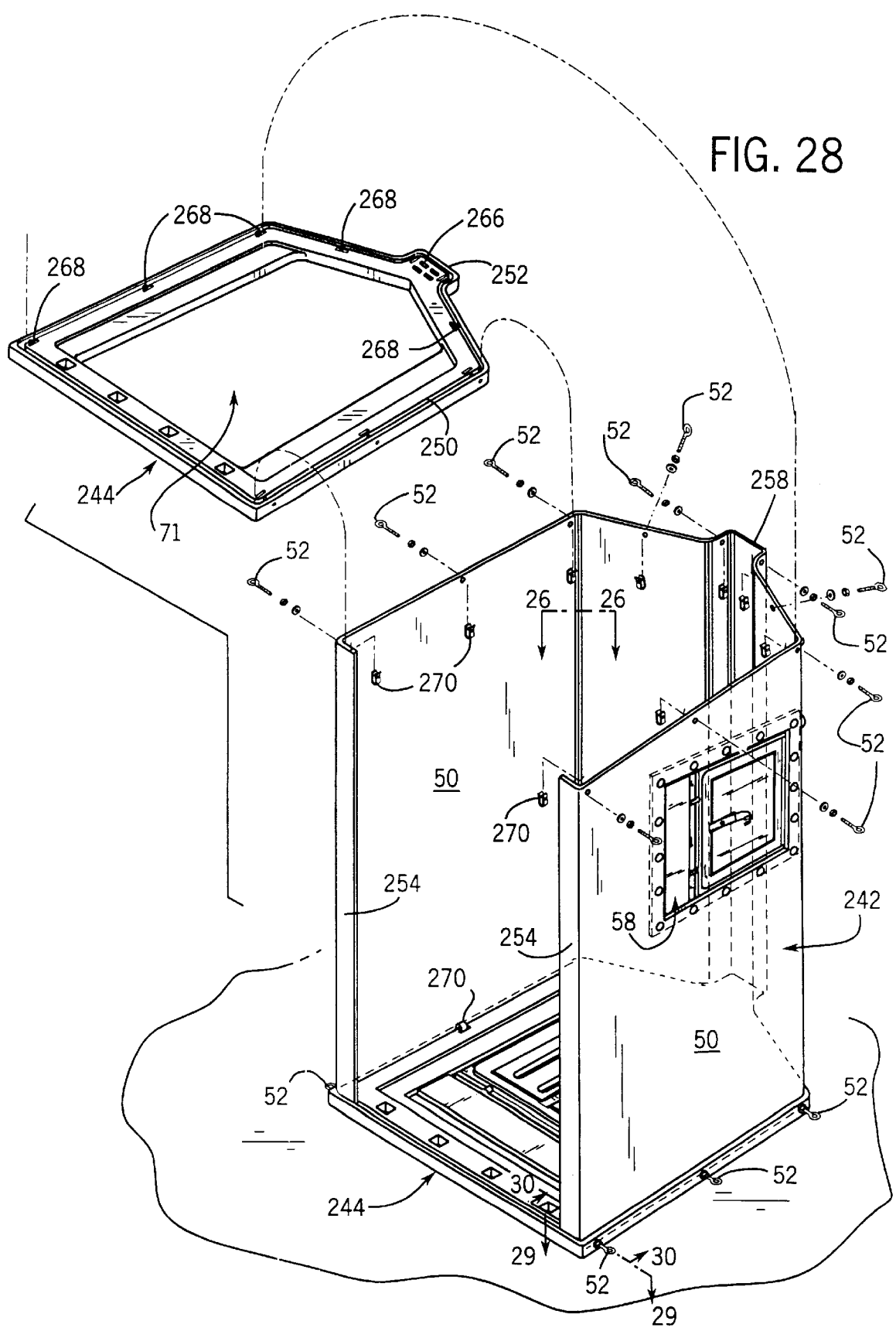
FIG. 28 is an exploded partial assembly view of the resin hutch of FIG. 23.

Referring generally to FIGS. 23, 24, and 25, the second embodiment 240 of the hutch of the present invention is generally constructed identically to that of the first embodiment. All like features of the second embodiment are numbered the same as those in the first embodiment. The second embodiment 240, however, does not include the support rods 46 and as a result modifications have been made to the cover 242 and end panels 244 to enhance the structural integrity of the hutch 240.

Referring to FIG. 26, the cover 242 of the second embodiment includes kerf grooves or cuts 248 on the inside surface extending longitudinally between the lateral ends cut or embossed approximately one half the thickness of the cover 242. Preferably, the kerf grooves 248 are made in eight sets of six (three grooves are shown in the figures) to correspond with the bends in the groove 250 in each end panel 244, namely at the bottom and top corners as well as the corners of the tab 252. However, the invention is not limited in this regard as there can be any suitable number of kerf grooves 248 at any suitable location. The kerf grooves 248 allow the cover 242 to be bent inwardly or outwardly through at least ninety degrees. In this way, the cover 242 can be bent to form the outline of the end panels 244, as defined by the groove 250. Specifically, the longitudinal ends of the cover are bent inwardly to form longitudinal feet 254 at the bottom of each lateral side, as shown in FIG. 27. Also, four sets of kerf grooves 248 proximate the lateral center of the cover 242 can be bent to form an inwardly facing channel 258 along the ridge-line of the hutch 240.

Referring to FIGS. 24 and 25, the end panels 244 of the second embodiment are nearly identical to that of the first embodiment having the same vent 68 and door 70 panel portions as described above. However, the frame portion 70 is changed slightly due to the lack of support rods in the hutch. Specifically in this embodiment, the frame portion 264 does not include recesses for receiving support rods. Also, the tab 252 of the second embodiment does not include a longitudinal channel at its mid-point and the perimeter groove 250 extends along the perimeter of the tab 252 as well as the entire bottom member 256. Thus, the groove 250 will accept the longitudinal feet 254 at the bottom as well as the ridge-line channel 254 at the top. The tab 252 also includes lateral cut outs 266 providing additional venting.

Referring to FIGS. 27–30, within the inside wall 62 of each end panel 244 spaced along the inside perimeter of the groove 250 are ten cut-out rectangular slots 268 each of which receive one leg 269 of a standard-sized, U-shaped fastener 270, commonly referred to as a "tinnerman nut" by those skilled in the art. The groove 250 receives the other leg 271 along with the lateral end of the cover 242. The tinnerman nuts 270 have threaded bores which engage with the threaded ends of the eye-bolts 52 used to fasten the end panels 244 to the cover 242.

The second embodiment of the hutch 240 of the present invention is assembled in a manner similar to the first embodiment 40. Referring to FIG. 27, as described above, one end panel 244 is laid face down on the flat surface 120 with the perimeter groove 250 opening upward. The cover 242 is unrolled and laid on the surface 120 with the longitudinal kerf grooves 248 facing upward. A side feed door panel 58 may then be fastened to the cover 246 as described above. Here, however, because no support rods are used, the cover 242 is bent at the kerf grooves 248 to create the turned in lateral feet 254 and the longitudinal channel 258 along the lateral mid-point of the cover 242. Once bent, one longitudinal end of the cover 242 is disposed within the perimeter groove 250 of the end panel 244 and secured in place by suitable fasteners, such as the eye-bolts 52, threaded into the tinnerman nuts 270 disposed in the slots 268 cut out from the inside wall 62 of the end panel 244. Rather than one eye-bolt disposed in the channel in the tab at the top of the end panel as in the first embodiment, two eye-bolts 52 are fastened to each lateral side of the tab 252 of the end panel 244. Also, two extra eye-bolts 52 are fastened to the end panel 244 substantially at the mid-point of the top members 76 to provide additional support. Referring to FIG. 27, then as before, the groove 250 of the other end panel 244 is placed onto the opposite lateral edge of the cover and secured in place. The side 56 and end feed door 70 latches 106 and chains 114 may be assembled as with the feed container baskets 119 and tether lines 54, as described above.

As with the first embodiment, the second embodiment may also be shipped in two packages 130, 132 as those shown in FIG. 22, each within the size and weight requirements of common commercial couriers. The second embodiment 280 is even lighter than the first embodiment 40 because no steel rods are included.

While the foregoing specification illustrates and describes the preferred embodiments of the invention, it is to be understood that the invention is not limited to the precise construction herein disclosed. Accordingly, the invention should not be limited to preferred embodiments described, but should be defined by the claims which follow.

I claim:

1. An improved plastic resin structure defining an enclosure including a top, sides and ends, at least one of the sides and ends having a door panel comprised of a first wall and a second wall, wherein the door panel is molded so that the first wall is fused to the second wall in some locations and separated from the second wall in other locations, the improvement wherein:

the first and second walls are separated along a door perimeter such that removal of a portion of the second wall extending along at least three sides of the door perimeter and removal of a portion of the first wall extending along the same three sides of the door perimeter defines a door made of the first and second walls that is integrally hinged to the door panel and wherein the second wall of the door panel defines a door opening within the door perimeter having a projecting rim and the first wall of the door defines a lip sized to overlap the door opening rim.

2. The improved plastic resin structure of claim 1, wherein the portion of the second wall is removed around all sides of the door so that the door is integrally hinged to the door frame by only the first wall.

3. The improved plastic resin structure of claim 1, wherein the top and sides are comprised of a flexible cover extending between the ends, the ends being sufficiently rigid to not collapse under the weight of the cover.

4. The improved plastic resin structure of claim 3, wherein each rigid end defines a groove proximate its perimeter for receiving opposite edges of the cover.

5. The improved plastic resin structure of claim 4, further comprising a plurality of support rods extending between the rigid ends supporting the flexible cover from within the enclosure, the ends of the plurality of support rods being disposed in recesses in opposing ends.

6. The improved plastic resin structure of claim 4, wherein the flexible cover includes kerf grooves along longitudinal bend lines for conforming the flexible cover to the shape of the rigid ends and defining a structural channel along the top and turned in edges along a bottom of the sides.

7. The improved plastic resin structure of claim 1, wherein one end includes a door panel and the other end defines an opening for entry into the structure.

8. The improved plastic resin structure of claim 7, wherein one of the sides contains an opening for receiving a door panel cut out from the end defining the entry opening.

9. A method of assembling a plastic resin structure having a flexible cover extending between first and second rigid ends, comprising the steps of:

(a) laying the first rigid end on a generally flat surface with a groove extending along a portion of the perimeter of the first rigid end opening away from the surface;

(b) inserting a first end edge of the flexible cover into the groove of the first rigid end;

(c) fastening the first end edge of the flexible cover within the groove of the first rigid end;

(d) placing the second rigid end over a second end edge of the flexible cover so that the second end edge is inserted into a perimeter groove of the second rigid end;

(e) fastening the second end edge of the flexible cover within the groove of the second rigid end; and (f) repositioning the structure so that the first and second rigid ends rest on the flat surface at essentially right angles.

10. The assembly method of claim 9, wherein step (b) further includes inserting a first end of at least one support rod into at least one recess in the first rigid end and step (d) further includes placing the second rigid end over the at least one support rod so that a second end of the at least one support rod is inserted into at least one recess in the second rigid end, wherein the at least one support rod supports the flexible cover.

11. The assembly method of claim 10, wherein the first and second rigid ends are generally five-sided having a lateral bottom extending between two transverse sides joined at a top by two lateral members forming an obtuse angle there between, wherein five support rods extend between the first and second ends, ends of the support rods being disposed in five recesses in the first and second rigid ends proximate five corners of the ends.

12. The assembly method of claim 9, where step (b) further includes bending the flexible cover along longitudinal kerf grooves so as to form the cover to the contour of the grooves of the first and second rigid ends.

13. The assembly method of claim 9, wherein longitudinal edges of the flexible cover extending between the first and second rigid ends define a radius.

14. The assembly method of claim 13, wherein the first and second rigid ends have an upstanding tab at a top having a groove at its perimeter for receiving a portion of the respective first and second end edges of the flexible cover and defining a longitudinal channel in the flexible cover extending between the rigid ends.

15. The assembly method of claim 9, wherein eye-bolts are used to fasten the first and second end edges of the flexible cover to the respective first and second rigid ends, further comprising the step of:

(g) anchoring the resin structure to the flat surface by lines extending from the eye-bolts to an anchor in the flat surface.

16. The assembly method of claim 9, wherein step (a) further includes unrolling the flexible cover before laying it on the flat surface.

17. The assembly method of claim 9, wherein step (a) further includes cutting an opening in a suitable location of the flexible cover sized to receive a door panel and fastening the door panel to the flexible cover proximate the perimeter of the opening.

18. The assembly method of claim 17, wherein the door panel is formed of two walls fused together at some locations and separated at other locations, a portion of the walls being cut to define a door integrally attached to the door panel at a living hinge without the door being separated from the door panel.

19. The assembly method of claim 18, further comprising the step of inserting a feed container basket within a feed container basket mount integral with the door panel at least one of the first and second walls, the feed container basket mount defining an elongated aperture for receiving a hooked end of a wire-frame feed container basket.

20. The assembly method of claim 19, wherein the door panel further includes a raised member beneath the feed container basket mount projecting out of the door panel to keep a feed container disposed in the feed container baskets substantially level.

21. The assembly method of claim 9, wherein the first and second rigid ends comprise two walls molded to be fused together at some locations and separated at other locations.

22. The assembly method of claim 9, wherein at least one of the first and second rigid ends define a door panel, a portion of first and second walls being cut to define a door integrally attached to the door panel at a living hinge without the door being separated from the door panel.

23. The assembly method of claim 9, wherein only one of the first and second rigid ends includes a door panel and the other rigid end defines an entry opening to the structure.

24. The assembly method of claim 23, wherein a door panel is removed from the rigid end defining the entry opening, the removed door panel being fastened over an opening in the side of the structure.

25. The assembly method of claim 22, wherein the door includes a slot at a free end of the door extending diagonally from the second wall through the first wall for receiving a latch slidable within the slot for retaining the door in close proximity to the door panel.

26. The assembly method of claim 25, further comprising the step of (h) fastening an eye-bolt above the door and joining the latch to the eye-bolt by a flexible line.

27. An animal hutch, comprising:

a flexible cover defining a top and sides, the cover having an opening at a side receiving a feed door panel;

a first rigid end defining an animal entry opening and a groove proximate an outer perimeter for receiving an end of the flexible cover; and a second rigid end defining a feed door panel having a door, the second rigid end having a groove for receiving an opposite end of the flexible cover.

28. The animal hutch of claim 27, wherein the animal entry opening is made by cutting out a feed door panel formed in the first rigid end, the opening in the flexible cover receiving the door panel cut from the first rigid end.

29. The animal hutch of claim 27, wherein each of the first and second rigid ends have a first wall and a second wall molded so that the first wall is fused to the second wall in some locations and separated from the second wall in other locations, wherein the first and second walls are separated along a door perimeter such that removal of a portion of the second wall extending along the entire door perimeter and removal of a portion of the first wall extending along all but one side of the door perimeter defines a door made of the first and second walls fused at door edges that is integrally hinged to the door panel at the first wall without being separated from the door panel.

30. The animal hatch of claim 29, wherein the second wall of the door panel defines a door opening within the door perimeter having a projecting rim and the first wall of the door defines a lip sized to overlap the door opening rim.

31. The animal hutch of claim 30, further comprising a plurality of support rods within the hutch, the plurality of support rods supporting the flexible cover and having opposite ends disposed in recesses in each of the first and second rigid ends.

32. The animal hutch of claim 30, wherein the flexible cover includes longitudinal kerf grooves facilitating bending the cover to conform to the grooves in the first and second rigid ends thereby forming a longitudinal channel at the top and turned in bottom edges along the sides.

33. The animal hutch of claim 27, further comprising at least one feed container basket mount integral with the door panel, the feed container basket mount defining an elongated aperture for receiving a hooked end of a wire-frame feed container basket.

34. The animal hutch of claim 33, further comprising a raised member in the door panel beneath the feed container basket mounts projecting out of the door panel to maintain a feed container disposed in the feed container baskets substantially level.

* * * * *